United States Patent [19]

Drake

[11] 4,372,404

[45] Feb. 8, 1983

[54] CUTTING TEETH FOR ROLLING CUTTER DRILL BIT

[75] Inventor: Eric F. Drake, Pearland, Tex.

[73] Assignee: Reed Rock Bit Company, Houston, Tex.

[21] Appl. No.: 185,691

[22] Filed: Sep. 10, 1980

[51] Int. Cl.³ .................. E21B 10/08; E21B 10/46
[52] U.S. Cl. ............................. 175/374; 175/410; 51/307
[58] Field of Search .......... 175/374, 410; 75/208 R, 75/206 R, 214; 76/108 A, 108 R; 51/307, 309

[56] References Cited

U.S. PATENT DOCUMENTS

| | | | |
|---|---|---|---|
| 2,467,642 | 9/1946 | Ashworth | 175/374 |
| 3,003,370 | 10/1961 | Coulter, Jr. | 175/374 |
| 3,305,923 | 2/1967 | Zimmer | 75/208 R |
| 3,495,670 | 2/1970 | Ditson | 175/410 |
| 4,054,449 | 10/1977 | Dunn | 75/208 R |
| 4,164,527 | 8/1979 | Bakul | 51/301 |
| 4,198,233 | 4/1980 | Frehn | 75/208 R |
| 4,276,788 | 7/1981 | van Nederveen | 76/108 A |

*Primary Examiner*—William F. Pate, III
*Attorney, Agent, or Firm*—Michael J. Caddell

[57] ABSTRACT

Cutting teeth for rolling cutter bits, including cutter inserts, cutter teeth formed in place, or formed separately and welded in place, etc., are formed by powder metallurgy as a densified powder metallurgical composite of at least two varying phases, said composite having a substantially continuous mechanical property gradient therethrough. One of said phases is preferably a refractory compound and another phase is a binder metal or alloy. The gradient is from one mixture of said phases in one region having hardness or wear resistant properties to another mixture of said phases in another region having toughness properties.

18 Claims, 10 Drawing Figures

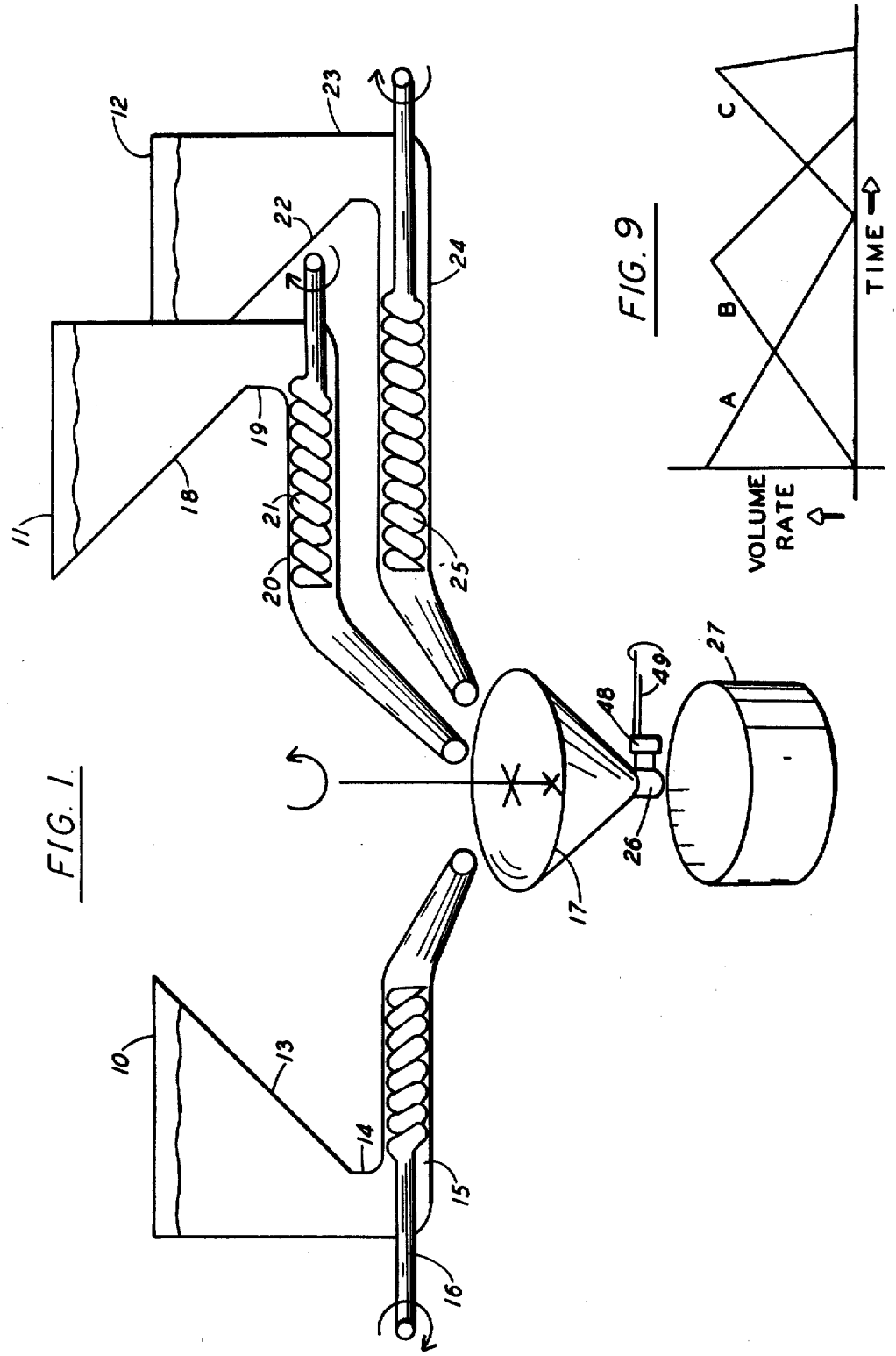

CUTTING TEETH FOR ROLLING CUTTER DRILL BIT

BACKGROUND OF THE INVENTION

The present invention generally relates to drilling bits utilized in the oil well drilling industry and in the mining arts, and more particularly involves a unique metallic composition for the cutting elements utilized in drilling bits. In the conventional drill bit technology, there are generally two kinds of rolling cutter drill bits, as well as what is termed drag bits having no roller elements. The rolling cutter drill bits are generally of the type having cantilevered frusto-conical cutters such as the tri-cone bit, and there are additionally bits having cutters mounted transversly on axles supported at each end by saddles, which in turn are affixed to large cutting heads. This second type of rolling cutter bit primarily is used in the mining and tunneling industries. In the tri-cone rolling cutter type of bit, there are generally two kinds of cutter structures utilized, the "milled tooth" cutter, and the insert cutter. In the milled tooth cutter, a large forging is milled away, leaving protruding, sharp, wide chisel-shaped teeth as the cutting elements. These projecting teeth may have a hard material, such as tungsten carbide, welded to their faces to increase their erosion resistance. The cutter bodies themselves may be carburized and hardened to increase their resistance to breakage and wear.

In addition to the milled tooth cutters, rolling cutter drill bits commonly utilize insert type cutters wherein a smaller original cutter body is utilized with a minimum amount of machining, and holes are drilled circumferentially around the cutter body to receive hard metal cutting inserts which are pressed thereinto. These hard metal inserts generally are formed of a tungsten carbide composite made in a generally cylindrical shape with a pointed protruding portion. The insert type cutter bodies generally are carburized and hardened prior to insertion of the inserts.

In the mining industry, the saddle type cutters most often used are the milled tooth variety, although the insert type cutters are becoming more widely used. The formation of these cutters is similar to that as described above with respect to the tri-cone drilling bit cutters. In the formation of the rolling cone cutting structures utilized both in the tri-cone bits and the mining bits, the two types of cutters can generally be classified as utilizing both gradient techniques and composite techniques, although none of the conventional cutters have combined these two techniques to arrive at a gradient composite metallic structure.

The term "composite" is used in the microstructural sense herein, as is commonly known in the fields of metallurgy and materials science. It refers to materials having microstructures composed of at least two individual phases, the volume fraction of a minor phase being at least 10%, which are bonded together in such a manner that the average properties of the composite are determined by the individual properties and morphology of each phase. This useage is distinct from that where an engineering structure may be referred to as a "composite" when it is comprised of two or more distinct, relatively large regions, bonded, coated, welded, or otherwise joined or internally transformed, forming a heterogeneous unit. See—THE PRINCIPLES OF ENGINEERING MATERIALS, Barrett, Nix and Tetelman, Prentice-Hall, Inc., 1973, pp. 316-317.

For example, both the milled tooth cutter and the insert type cutter utilize the composite structures in that they both have a steel alloy cutter body to which is added a hard metal cutting surface, or cutting element. In the milled tooth cutter the composite hard metal element is added as a tungsten carbide alloy weldment which is fused to the cutting surfaces on the teeth, the gage, and portions of the cutter body. In the insert type cutter, the composite element is added by the insertion of the cemented carbide insert into the alloy steel cutter shell. The result of these two types of composite metallurgical construction is a "metallurgical notch", where a very sharp gradient is formed across the interface between the hard metal and the alloy steel. In addition to this metallurgical notch, or discontinuity, the composite formed thereby also suffers from a disadvantage in that a geometrical notch is also usually formed at the juncture. These metallurgical and geometrical notches serve to weaken the resulting composite metal component and contribute to earlier failure of the cutting structure. These discontinuities in elastic moduli, coefficients of thermal expansion, and yield characteristics limit drilling performance by affecting the residual stress distributions and applied stress distributions in service. These characteristics and changes result from all of the different techniques which have been utilized in conventional cutter construction for reducing deformation and improving wear-resistant qualities on drilling equipment.

The composites utilized in conventional cutters have increased the mechanical strength, toughness and hardness but have not efficiently optimized these characteristics for drilling equipment. In addition to the welding of hard metal, such as cemented carbides, on the cutting structures, other conventional techniques have involved brazing of the cemented carbides, plasma spraying of cemented carbide coatings, and chemical and electrical deposition of coatings having high carbide fractions. All of these techniques suffer from the above-mentioned mechanical and metallurgical discontinuities at the joint interface. Likewise, the insert cutter construction has been utilized to improve the mechanical strength, toughness and wear resistance of the cutting structure, but it still suffers from the elastic strain requirements of the interference fits, in addition to the limitations of the steel-composite interface on load bearing ability.

The use of mechanical property gradients in conventional drilling tools has been known and accepted for many years. For example, gradients are introduced into the cutting structures by the case hardening, carburizing treatment of steels. The resultant gradient of a carburized case-hardened steel comprises a hard brittle outer surface shell with a tapering-off of the hardness and increase in toughness towards the interior of the part. This has been successful in reducing galling and spalling of bearing surfaces and other high unit loading contact areas, but offers little improvement to erosion resistance which is prevalent in rock drilling. Also, this type of gradient is generally relatively shallow, usually extending no more than 0.050 inches into the steel component, thus subjecting the surface to cracking or failure by plastic deformation. Other types of mechanical property gradient-producing processes include laser and induction hardening, nitriding and boronizing.

The present invention overcomes these disadvantages and provides an optimum cutting structure by the use of gradual or continuous gradients across the geometry of the cutting structure. This continuous or gradual gradient substantially eliminates the interface and the resultant geometrical and metallurgical notches found in the conventional cutter construction. The elimination of the discontinuities may involve varying several different parameters to achieve different desirable techniques. For instance, the composition, the fraction, the shape, the size and the distribution of phases in a cemented carbide composite may be systematically varied by powder metallurgy techniques to produce an insert with continuously varying properties. The gradient through the insert can be arranged so that a hard, stiff, abrasion-resistant cemented carbide structure exists at the tip of the insert, merging into a tougher, softer cemented carbide structure in the regions of high bending stress lower in the insert body. The gradient across the inserts can also be arranged such that when fused to the normal alloy steel cutter shell, the attachment surface of the insert can be substantially of the same composition as that of the alloy steel cutter shell so that the added insert becomes an integral part of the cutting structure as though originally formed therewith, and a hard metal core extends downwardly along the central longitudinal axis of the insert.

In a second embodiment of the invention, the cutting structure is formed in a single operation rather than by the addition of inserts to a cutter shell. In this embodiment, the cutter and the teeth structure are formed in a single manufacturing operation utilizing powder metallurgy techniques. A programmable mixing system for mixing the alloying components of a powdered metal alloy serves to place the proper concentrates of the cemented carbides in the locations requiring the properties of cemented carbides and gradually reducing the cemented carbide fraction as you move geometrically away from these critical points. The resulting cutting structure therefore has concentrated fractions of cemented carbide in the high-stress, high-erosion areas with a gradual decrease in the hard metal component away from these critical areas towards the body of the cutter. The alloyed powder metallurgy components are then densified into a single integral cutting structure utilizing conventional powder metallurgy techniques, such as hot isostatic pressing. Then the completed cutter is removed from the pressing die and minor machining operations can be performed to create smooth bearing surfaces and seal surfaces within the cutter where required. Thus, it can be seen that the resulting drilling bit cutter offers an optimum metallurgical cutting structure in that it utilizes the desirable effects of the composites, such as cemented carbides, in the locations on the cutter where such characteristics are desirable, and the desirable characteristics of a tough resilient core, such as the alloy steels, for strength and foundation in the cutter shell itself with a smooth continuous gradient between the cemented carbide and the alloy steel to greatly reduce or eliminate discontinuities and their resultant stress risers. In addition, the locations of the gradients and the gradient rates can be manipulated to provide favorable compressive residual stress patterns in a finished component, thereby raising the effective fracture resistance of the resulting cutting structure.

BRIEF DESCRIPTION OF THE DRAWINGS

FIG. 1 is a schematic drawing illustrating one embodiment of the powder mixing process. FIGS. 9-11 illustrate graphically the relationship between powder feed rates and time.

DESCRIPTION OF THE PREFERRED EMBODIMENTS

Figure 3:
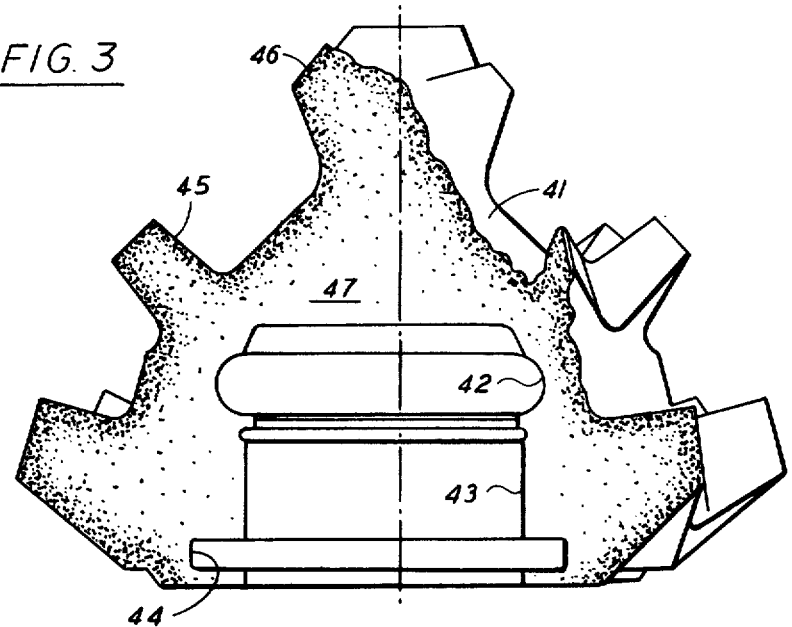
FIG. 3 is a partial cross-sectional drawing illustrating a rolling cutter manufactured by the process of FIGS. 1 and 2.

Referring now to FIG. 1, which illustrates a schematic diagram indicating one particular method of forming the gradient composite metal structures of the present invention, a plurality of powder supply bins feed powder through a closely controlled auger system into a mixing chamber from whence it flows into a rotating die. In this embodiment, a primary supply bin 10 is supplied with a powdered metal A having a high percent carbide fraction. A secondary supply bin 11 is provided with a powdered metal B having a low percent carbide fraction, and a tertiary supply bin 12 is supplied with a powdered metal C comprising a steel alloy having superior bearing qualities. Primary bin 10 is provided with a funnel-shaped wall 13 feeding through a section 14 into a screw auger tube 15. A rotating screw 16 is rotatably located in channel 15 to accurately dispense powder A into the mixing chamber 17. The feed auger 16 is preferably microprocessor-controlled to precisely discharge controlled amounts of powder A at variable rates into chamber 17. Likewise, secondary bin 11 has a funnel-shaped wall section 18 feeding into a narrowed throat section 19 and thence into auger tube 20 having screw auger 21 rotatably mounted therein and tightly controlled by a second microprocessor circuit (not shown). Tertiary bin 12 has a funnel-shaped wall section 22, throat section 23, screw auger tube 24, and feed auger 25, which is also microprocessor-controlled for precise metering of powdered metal C into mixing chamber 17. Powder dispensed in mixing chamber 17 flows through a vibratable discharge chute 26 into a rotating die 27 whenceforth it is moved by centrifugal force outward into the outer cavities of die 27. A vibrator 48 is located on chute 26 to facilitate the flow of powder therethrough. FIG. 9 illustrates a schematic graph showing the feed rates of the various powders A, B and C into die 27 in a typical process embodying the present invention. The vertical axis of the FIG. 9 graph represents the rate of powder flow into the mixing chamber 17 and the horizontal axis indicates the time continuum. It can be seen from FIG. 9 that by means of the microprocessor system (not shown), which system is well known in the art, the volume of powder flow initially is heavy in component A and light in component B, with no component C being introduced. The volume feed rate of component A decreases with time at about the same rate component B increases with time until a point where component B peaks out slightly before component A is completely shut off. Component B then begins to decrease in volume feed rate, and at the time component A is terminated, component C begins feeding into chamber 17. Component B decreases to a point where only component C is being introduced into the rotating die and component C is introduced therein until the die cavity is completely filled.

By the use of the present system, the high percent carbide fraction A ends up in the outer extremities and surface portions of the product being formed in the rotating die 27. Then moving inward towards the inner portion of the component being built, the percent of high carbide fraction component A gradually reduces as the percent of component B increases, resulting in a gradual continuum of high carbide fraction to low carbide fraction. Then towards the inner portion and center of the component is the final component C comprising a powdered metal of an alloy steel having superior bearing surface qualities.

It should be noted that, in powder metallurgy processes, the powdered metal constituents of the part being manufactured must be compressed to remove the gas voids and heated to solidify and strengthen the part. This is normally done in one of several ways. One method uses a pre-compaction of the powder into a "green" part and then sintering at a temperature above the liquidus temperature to fuse the powder. The sintering usually occurs in a vacuum or inert gas atmosphere. An alternative process comprises Hot Isostatic Pressing, commonly termed, "HIPing". Other processes such as hot forging are also used. For convenience, all such processes will be occasionally referred to herein as "densification".

Figure 2:
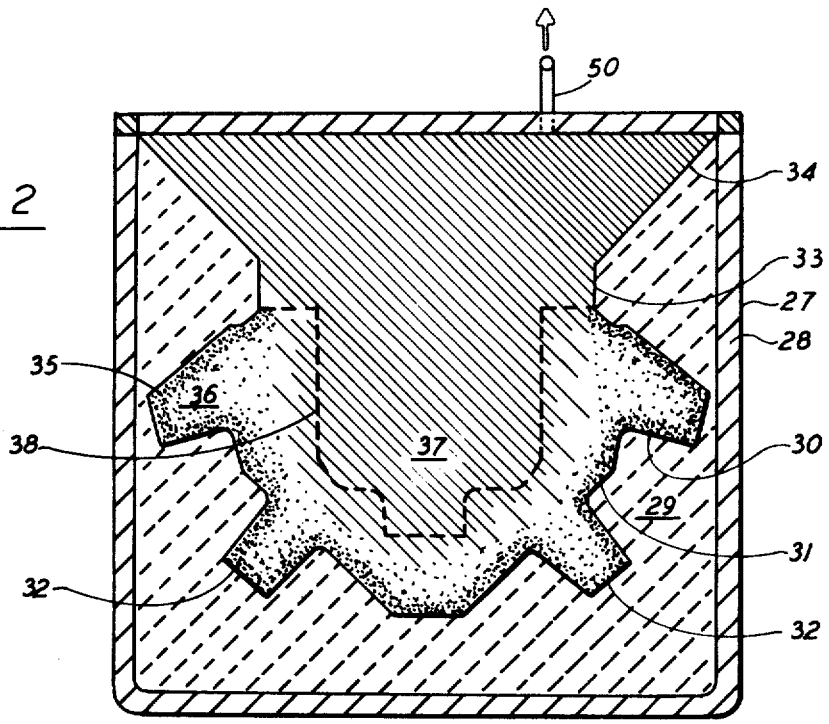
FIG. 2 is a cross-sectional schematic drawing illustrating the apparatus for manufacturing a powdered metal cutter.
Figure 7:
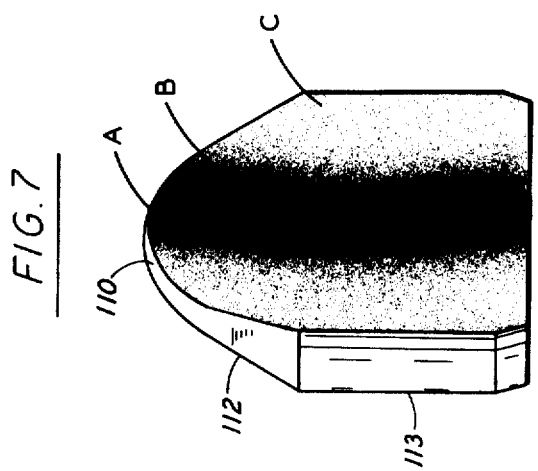

Referring now to FIG. 2, the rotating die 27 is illustrated in close-up cross-sectional view. The inner configuration of die 27 is adapted for manufacturing a typical integral tooth rolling cutter for a tri-cone drilling bit. In this particular embodiment, die 27 comprises a tough metal outer shell 28 made of a material such as steel and a disposable material 29, such as castable ceramic, molded by a conventional process such as a lost-wax or investment casting process. Ceramic material 29 is formed in the shell 28 with an internal cavity 30 shaped to correspond to the external dimensions of an integral tooth cutter body for use in the aforementioned drilling bit. This cavity generally has a body section 31 which has radially outwardly projecting tooth sections 32. Above the cutter cavity is a generally cylindrical filler neck 33 with a funnel-shaped top 34. During the powder-filling stage of forming the cutter, powder A is first fed into the rotating die 27 such that it forms around the surface of the teeth and cutter body as indicated at 35. The distribution of powdered metal along the irregular surface of the die cavity may be controlled by the rotary die speed, orientation of the die rotational axis with respect to the vertical, and/or the geometric configuration of discharge chute 26. This configuration may be selected to provide a stream of any desirable width or may be adapted to produce a uniform or non-uniform "curtain" of powder. Powder A is heavy in the cemented carbide component of the final cutter metallurgical content. Because of the rich feed rate of component A during the initial filling of cavity 30, the outer extremities of cavity 30, such as indicated at 35, have an extremely high percentage content of the cemented carbide component moving inwardly from the outer surface of the cavity. A gradually decreasing amount of cemented carbide and increasing amount of matrix material is encountered in the area 36. This corresponds to the decreasing feed rate of component A and the increasing feed rate of component B, as shown in FIG. 7. Near the center of cavity 30 is relatively pure component C corresponding to the far right-hand portion of the graph in FIG. 9. This is indicated at 37 in FIG. 2. A phantom line 38 is disclosed showing the desired final outline of the internal portion of the cutter after it has been densified into the final product, and machined to create internal bearing areas.

After the varying gradients of the powdered metals have been added to cavity 30, the die shell is closed by steel cap 40 which is welded across the top, and the gas content is evacuated through pipe 50. The die is then placed in a HIPing chamber where a pressurized inert gas such as argon is introduced. The hydrostatic pressure of the inert gas is increased and the temperature in the chamber is simultaneously increased until cap 40 is deformed inwardly. The powdered metal is thus compressed radially outward into cavity 30 to form the final sintered metal part having the external shape shown in FIG. 3. After a sufficient period of time, pressure, and temperature to completely solidify the powdered metal in cavity 30, cap 40 is removed and the ceramic material 29 is fractured to remove the completed, solidified cutter.

Referring to FIG. 3, the cutter 41 is shown after removal from the centrifugal die. Cutter 41 may then be machined to provide bearing surfaces 42 and 43 and a seal cavity 44. Cutter 41 in its final state is a single integral body member having protruding teeth 45, with the body 41 and teeth 45 exhibiting a gradual metallurgical gradient beginning with a high tungsten carbide surface and thickness 46, and ending in a low carbide, high steel bearing area 47 for superior bearing surfaces 42 and 43. The gradient from the extremely high carbide content area 46 to the extremely low carbide content 47 is almost uniform and gradual across this thickness. This resulting cutter has no metallurgical notches, as mentioned with respect to the prior art, and as a result, offers extreme hardness and erosion resistance at the outer surfaces and along the cutting members 45 while the inner area 47 provides extreme toughness and hardenable surface material for bearings and seals. Also, the cutter exhibits a surface greatly freed of pores and defects.

Figure 4:
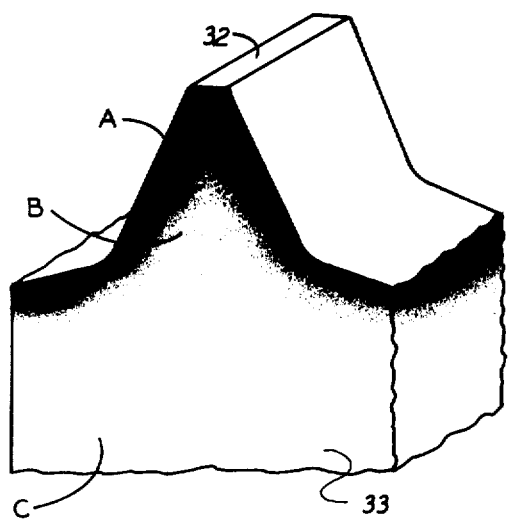
FIGS. 4, 5 and 6 illustrate cross-sectional partial views of different embodiments of the present invention utilized in integral tooth cutters.
Figure 5:
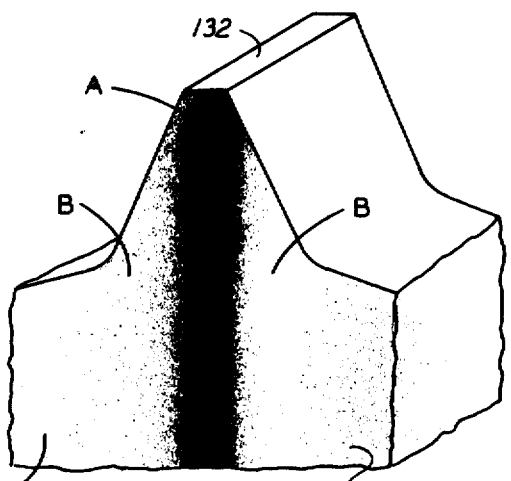
Figure 6:
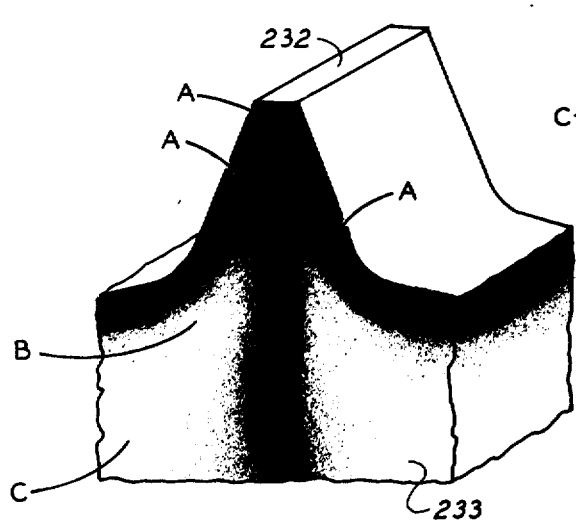

Referring now to FIGS. 4 through 6, various constructions for cutter teeth are disclosed in broken-out, partial cross-sectional illustrations. FIG. 4 illustrates the teeth 32 as shown in FIGS. 2 and 3. In tooth 32, the entire outer surface comprises the tungsten carbide-rich component A with a gradual decrease in carbide in area B and a relatively pure alloy steel in area C. Although tooth 32 is disclosed as part of the integral cutter member 41, an alternate method of manufacturing cutter 41 is to form the teeth in a separate operation. Each tooth could be precompacted in green form utilizing powder metallurgy techniques, and then inserted into their proper cavities in die 27. Then the remainder of powder to form the cutter body is added to the die and the entire cutter is then densified by Hot Isostatic Pressing. Alternatively, the teeth and cutter can be densified separately and then fused together by means such as electron beam welding.

FIG. 5 illustrates a different gradient concept embodied in a tooth member 132. In this embodiment, a carbide-rich fraction A is disclosed running longitudinally through the center of a tooth member 132 and downward into the root section 133. The rich carbide section comprises a generally planar shape running transversely through tooth member 132. A gradient is established with material B on both sides of the carbide-rich plane A. The remainder of root section 133 is made up of primarily steel C. The high-modulus core of this structure is particularly adapted to carry drilling stress into the cutter body by an internal route rather than across defect-prone surfaces.

FIG. 6 illustrates in a broken-out, partial cross-sectional isometric view a third embodiment 232 of cutting teeth for cutter body 41. In tooth 232, a carbide-rich area is formed along the surface of the tooth and the root section, and also a carbide-rich area is formed down through the center of the tooth in a planar shape similar to that of FIG. 5. Actually, the cutting tooth 232 is a combination of the structures 32 and 132. The remainder of the tooth and a portion of the root section 233 comprise the mixed component B, and the remainder of root portion 233 is made up of pure steel alloy C. As previously mentioned, manufacturing techniques to form the cutting teeth 32, 132 and 232 can be utilized in the process of FIG. 1 to form an integral cutter assembly or alternatively, the individual cutting teeth may be formed separately in a gradient forming process and then densified as a unit with the body or may be separately densified and then added to the cutter body preferably along isopleths of composition by means such as welding or fusion.

Although not shown in the drawings, one such procedure for manufacturing these teeth separately would be cold isostatic pressing in polymeric molds shaped like the final tooth configuration desired. The mold would be identical for the three embodiments of cutting teeth, but the introduction of the various powder fractions would be different for each tooth. The process for tooth 32 would involve spraying the carbide-rich fraction A with a carrier fluid into the tooth mold initially, then gradually changing to fraction B and ending up with fraction C. After evacuating the residual carrier vehicle, pressure would be applied to the mold to form the cutting tooth 32. The resulting green compact would then be densified by sintering or HIPing.

Figure 8:
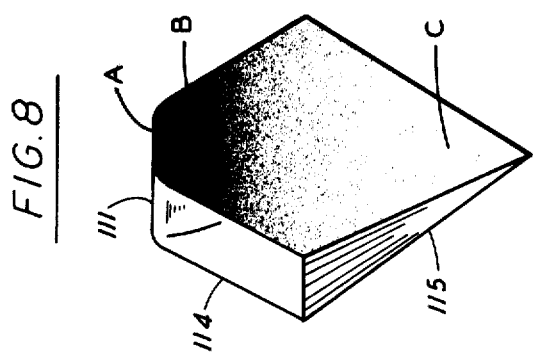
FIGS. 7 and 8 illustrate partial cross-sectional views of inserts made according to the present invention.

FIGS. 7 and 8 are partial cross-sectional views of tungsten carbide cutting elements commonly termed, "inserts". In FIG. 7 insert 110 is formed in the conventional insert shape but exhibiting the gradient composite concept of the present invention. For example, insert 110 comprises a generally truncated conical protrusion 111 extending upward from a generally cylindrical base portion 112. A central axial core section is made up of the carbide-rich material A extending throughout the length of insert 110. The mixed component B is located radially outward from A, and the basic matrix metal C is located around the surface of the insert. The carbide-rich fraction extends from the very tip of truncated portion 11 to the very base of portion 112.

Conversely, in FIG. 8, insert 111 has a conical base portion 115 and a truncated conical protruding portion 114. Protruding portions 114 and 112 could alternatively be formed in another geometrical shape, such as hemispherical, pyramidal, ogive, compound conical, or any combination of these. Also base portions 113 and 115 could be formed of any geometrical shape which lends itself to easy fusion into the cutter shell. The base portion 115 is made conical for easy welding by a beam welder such as an electron beam, which can be easily rotated to form the conical weld line along the surface of base 115. Other surface configurations could be used on base 115 for other types of welding. For example, for friction or inertia welding, any easily formed surface of revolution, such as spherical or parabolic, could be employed.

Insert 111 has a carbide-rich material extending all the way across the top surface of the truncated portion 114 of the insert. The carbide-rich material A basically comprises the top end or the cutting end of the insert, and the composite gradient extends downward towards the lower end of the insert. The process for manufacturing the inserts shown in FIGS. 7 and 8 is very similar to that described above with respect to FIGS. 4 through 6, i.e., filling the die cavity of a stationery or rotating die, followed by compaction and/or encapsulation, and then sintering or HIPing. This results in the gradient composite structures illustrated in FIGS. 7 and 8 for the insert type cutting elements, which inserts exhibit localized tungsten carbide-enriched areas gradually changing to an almost pure steel alloy, cobalt alloy, or other matrix metal area such as indicated at C. The finished inserts are then inserted into openings in the conventional cutter bodies by interference fitting or fusion techniques.

In the above-described process, various alloys and elements may be utilized and substituted in the makeup of components A, B and C. For example, when manufacturing complete cutters such as illustrated in FIGS. 2 and 3, the components A, B and C are selected to provide a gradient ranging from tungsten carbide to a bearing steel. For example, component A would comprise a powdered tungsten carbide-cobalt mixture having about 14 to 14.5% cobalt and the remainder tungsten carbide, with a tungsten carbide grain size of 1.5 to 2 microns. Component B would be a powdered metal comprising about 18 to 19% cobalt and the remainder powdered tungsten carbide, with the tungsten carbide grain size being about 1 to 1.5 microns. Component C would be a prealloyed atomized powder of a bearing steel such as AISI 52100.

Figure 10:
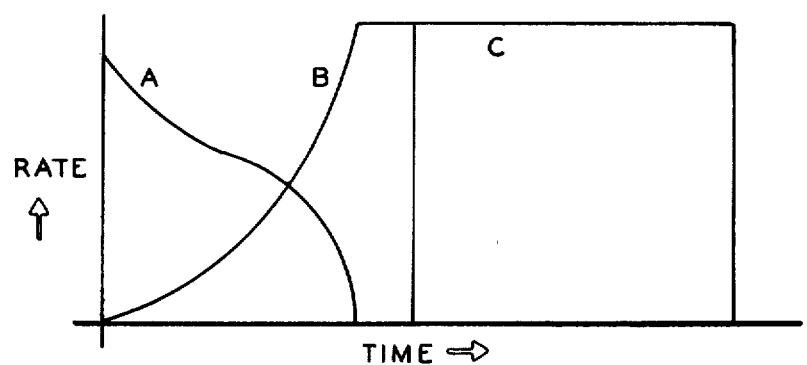

The rate of powder feed with respect to time for this particular example is illustrated in the graph of FIG. 10. The initial powder feed would be substantially all of the A component, with the feed-rate decreasing at a non-linear rate. Concurrently, the feed-rate of B would begin at zero and increase at a non-linear rate to a maximum level at approximately the same time the A powder feed-rate ceases. The B feed-rate would continue for a short period of time and then be abruptly stopped while the feed-rate of C is abruptly initiated at substantially the same time that the B rate is stopped, and at substantially the same level.

As a result of this component feed-rate matrix, a large amount of the tungsten carbide-rich powder A will be placed in the outer regions of the mold cavity, and then the immediately-inward regions receive primarily the B material having an increased percentage of the cobalt matrix and a decreased percentage of tungsten carbide, with the interior portion of the mold cavity having substantially pure alloy steel. It should be noted that this feed diagram illustrated in FIG. 10 appears to initiate the discontinuity or gradient between materials B and C, but this is not detrimental because of several factors. The elastic and plastic behaviors of materials B and C are very similar, as well as the temperature coefficients of expansion for these two materials. Likewise, a certain amount of migration and diffusion between the two materials will occur during the densification process.

In addition to this example of forming the cutters of FIG. 2, a second example could be utilized to obtain different material properties with the gradient composites. For instance, the A material would comprise a powder having 10% cobalt and 90% tungsten carbide, with a tungsten carbide grain size of 2 to 3 microns. The B component would comprise approximately 18 to 19% cobalt powder, with the remainder being tungsten carbide having a grain size of 1 to 1.5 microns. Component C would comprise a powdered mixture with 60% of the powder comprising an iron/nickel/carbon alloy, with the remainder being tungsten carbide of sub-micron particle size.

Figure 11:
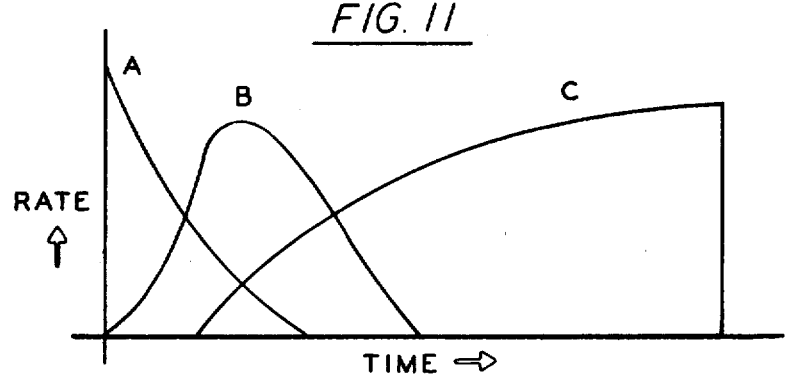

FIG. 11 illustrates a feed rate graph for use with this set of powder components. As in the other examples, powder component A is first introduced into the cavity in large quantities, and the introduction of powder A decreases in a non-linear fashion with time. Component B begins introduction and increases non-linearly as A decreases. The feed rate of component B peaks and begins decreasing, with component C being introduced at a point approximately coinciding with the peak of component B and increasing at a non-linear rate to a point where component C is abruptly terminated. Component A and component B are both terminated during the increase in feed rate of component C. Although the aforementioned example is stated as being particularly useful in manufacturing the cutters of FIGS. 2 and 3, it should be noted that this system of component compositions and feed rates would similarly be advantageous for manufacturing the inserted cutting teeth, as shown in FIGS. 4 through 8.

Another example of compositions which would be particularly useful for manufacturing the cutter of FIG. 3 and/or the inserted cutting elements of FIGS. 4 through 8 would consist of component A having about 14.5 to 15% iron/nickel/carbon alloy and the remainder a tungsten carbide having a grain size of 1.5 to 2 microns. Component B would be a powder having about 25% of the iron/nickel/carbon alloy, with the remainder a tungsten carbide having a grain size below 1 micron. Component C would comprise about 60% of the iron/nickel/carbon alloy, with the remainder being sub-micron sized tungsten carbide powder. The time-feed-rate relationship of this example would be similar to that of the immediately preceding example, as illustrated in FIG. 11. As previously mentioned, this set of components and the associated time-feed-rate relationship would be useful in manufacturing both integral cutters and replaceable cutting teeth.

A fourth example of the component feed-rate relationship, which is particularly useful in manufacturing the inserts illustrated in FIGS. 7 and 8, would be one utilizing about 10 to 10.5% cobalt and about 90% tungsten carbide, with a grain size of 2 to 3 microns for component A. Component B would comprise about 14 to 14.5% cobalt and the remainder tungsten carbide with a grain size of about 1.5 to 2 microns. Component C would comprise about 18 to 19% cobalt and the remainder a tungsten carbide having a grain size of about 1 to 1.5 microns. The materials of this example would be utilized in a feed-rate-time relationship similar to that disclosed in FIG. 9. An insert manufactured according to this example would be placed in a cutter shell very similarly to the placement of conventional inserts. The cutter shell would be drilled with holes, and the inserts would be press-fit into the drilled holes.

The inserts, or cutting teeth, formed by the third example above, preferably would be welded into the cutter shell, or might be fusion-bonded in the cutter.

The inserts or cutters formed according to the second example differ from the components manufactured by the last two examples in that in addition to the gradient in hard metal fractions, an additional gradient is introduced—that being the chemical gradient between the tungsten carbide material and the iron/nickel/carbon alloy. Likewise, the first example introduces the additional chemical gradient between the tungsten carbide hard metal fraction and the iron/nickel/carbon alloy.

Although the examples and descriptions given above relating to the processes and products formed by the present invention deal entirely with the use of three component systems, i.e., A, B and C, it can be seen that a simpler system utilizing only two components, i.e., A and B, could be utilized, although the results obtained might not be as desirable as the three-component system. The two-component system might comprise a first component A, which is a powdered binder metal or binder metal alloy, and a second component B, which is a pure powdered tungsten carbide. This two-component system would be particularly advantageous in manufacturing the insertable cutting elements such as those disclosed in FIGS. 7 and 8. Conversely, a system could be utilized to implement the present invention wherein more than three components are added together to form a more complex gradient within the cutting structure. For example, a four-component system can be visualized in which the A component may comprise a pure binder metal or binder alloy powder; the B component may comprise a pure powdered tungsten carbide; the C component may comprise a mixture of a binder metal and the tungsten carbide, or the tungsten carbide and a bearing steel alloy; and the D component may comprise a pure bearing steel alloy. Even further visualizations can foresee five- and six-component systems for manufacturing the cutting structures, or even more.

Thus, it can be seen from the description given above that this invention reveals methods for manufacturing unique, gradient composite cutting structures particularly advantageous for use in underground drilling tools. These unique methods and the novel articles manufactured thereby provide cutting structures which have greatly reduced, and in some cases eliminated, the previously mentioned undesirable metallic and geometric notches which lead to early failure in conventional drilling equipment. Primarily these notches are eliminated by the provision of a gradually changing composite material which goes from an almost pure cemented tungsten carbide fraction to an almost pure alloy steel or matrix metal fraction, with the tungsten carbide fraction being located in the areas of high point contact loading and high erosion, and the matrix metal or alloy steel being in areas requiring toughness and strength as well as areas requiring machineability and hardenability suitable for bearing and seal surfaces. Between the points of high tungsten carbide content and high alloy steel content, the change from one fraction to the other is gradual rather than abrupt, and as a result, regions of high stress normally occurring at metallic and geometric notches have been reduced or eliminated. In addition to this location of gradual gradients and elimination of notches and discontinuities, the properties of the cutting structures can also be varied desirably by changing the rate of gradient utilized in the entire cutting structure and/or changing the rate of gradients in particular regions of unusual high stress and/or erosion occurrences.

Furthermore, the gradients can be utilized to provide residual compressive stresses in favorable locations in a finished component to increase the effective fracture resistance of that element. Other parameters can be closely controlled and varied by utilizing the present invention, i.e., the grain size of the tungsten carbide material can be varied to obtain advantages in the different sized grain structures, the amounts of matrix material in the tungsten carbide fraction can be varied to obtain varying hardnesses in the resulting cutting elements, and the alloy content of the C fraction can likewise be varied to obtain particular hardenability in the bearing surface areas.

Thus, the present invention embodies the use of intentional variation in the fraction, composition, shape, size and/or distribution of phases in a cemented carbide/alloy steel composite to produce an insert or onsert with continuously varying properties. The property gradients can be designed to accommodate stress field variations resulting from geometry and loading characteristics.

Although certain preferred embodiments of the present invention have been herein described in order to provide an understanding of the general principles of the invention, it will be appreciated that various changes and innovations can be effected in the desired composite gradient structure without departure from these principles. For example, various residual stresses may be introduced strategically within the cutting element to increase resistance to failure from cracking and/or erosion. Similarly, the present invention can be utilized to reduce discontinuities and notches in composite elements manufactured from metallic fractions other than cemented carbides and alloy steels. In any event, whatever fractions present in the cutting structure, the present invention allows one to vary the composite gradient so that the hard phase may possess orientational variation with respect to location, a changing volume fraction, and aspect ratio, and the element may also possess a varying metallurgical chemistry. The binder phase metallurgy could be structured to evidence compatible variation. Additional phases can be utilized in the composite to result in a greater number of potential variations which, in light of this invention, would be known to those skilled in the art of metallurgy. It is also clear that, whereas this invention is illustrated and described in relation to drilling and cutting tools, that it should not be limited thereto, and can be applied by those skilled in the art to any structural metal component, given the inventive steps disclosed herein. All modifications and changes of this type are deemed to be embraced by the spirit and scope of the invention except as the same may be necessarily limited by the appended claims or reasonable equivalents thereof.

The embodiments of the invention in which an exclusive property or privilege is claimed are defined as follows.

1. A cutting element for attachment to a rolling cutter which is rotatably mounted on a drill bit,
said cutting element comprising:
a root portion adapted for engagement in a bit cutter; and,
a cutting portion on said root portion adapted to protrude from a bit cutter in a cutting orientation;
wherein said cutting element comprises a portion of substantial thickness comprising a densified powder metallurgical composite of at least two varying phases, said composite having a substantially continuous mechanical property gradient through said cutting portion.

2. The cutting element of claim 1 wherein
at least one of said phases is a refractory compound and at least one other phase is a binder metal or alloy.

3. The cutting element of claim 2 wherein
said refractory compound is a transition metal carbide and said binder metal or alloy is iron, cobalt, nickel or copper.

4. The cutting element of claim 3 wherein
said transition metal carbide comprises tungsten carbide with the volume fraction of tungsten carbide comprising said one phase ranging from about 0 percent to about 95 percent and the volume fraction of said binder metal or alloy comprising said other phase being from about 100 percent to about 5 percent,
at least part of the surface of said cutting portion comprising a large volume fraction of said tungsten carbide and a small volume fraction of said binder metal or alloy and another portion of said cutting portion comprising a substantially lesser volume fraction of said tungsten carbide and a substantially greater volume fraction of said binder metal or alloy than on said surface portion, with a continuous composition gradient therebetween.

5. The cutting element of claim 2, 3, or 4 wherein
the cutting portion of said cutting element is chisel-shaped,
said one phase is concentrated relative to said other phase at the surface of said cutting portion, and
said other phase is more concentrated relative to said one phase in the interior of said cutting element.

6. The cutting element of claim 5 comprising in addition
a vertical planar region comprising a large volume fraction of said one phase and small volume fraction of said other phase extending transversely through the interior of said element.

7. The cutting element of claims 2, 3, or 4 wherein
said cutting element has a generally cylindrical base portion with a substantially conical truncated cutting portion.

8. The cutting element of claim 7 wherein
said one phase is concentrated relative to said other phase at the outermost end of said cutting portion.

9. The cutting element of claim 7 wherein
said one phase is concentrated relative to said other phase along the central longitudinal axis of said cutting element.

10. The cutting element of claim 1, 2 or 3 in which
said composite gradient varies from one mixture of said phases having wear and deformation resistant properties at one point to another mixture of said phases having toughness properties at another point.

11. The cutting element of claim 1, 2 or 3 in which
said composite gradient varies from one mixture of said phases having wear and deformation resistant properties at one surface of at least part of said cutting portion to another mixture of said phases having toughness properties in another portion thereof.

12. The cutting element of claim 1, 2 or 3 in which
said composite gradient varies from one mixture of said phases having wear and deformation resistant properties at the exterior surface of said cutting portion to another mixture of said phases having toughness properties in another part thereof.

13. An insert for use in an insert-type rolling cutter drill bit, said insert comprising:

a geometric base portion for insertion into a matching hole in a drill bit cutter; and, a tapered, geometrical cutter portion formed on said base portion and adapted to protrude from said hole in a drill bit cutter;

wherein said insert cutter portion comprises a densified powder metallurgical composite of at least two varying phases, said composite having one portion in which one phase is present in a large volume fraction relative to the other phase, another portion in which said other phase is present in larger volume fraction relative to said one phase and having a substantially continuous mechanical property gradient therebetween.

14. The insert of claim 13 wherein said base portion is substantially conical and said one phase comprises a transition metal carbide and said other phase comprises a binder metal or alloy.

15. The insert of claim 13 wherein said base portion is substantially cylindrical and said one phase comprises a transition metal carbide and said other phase comprises a binder metal or alloy.

16. The insert of claim 14 or 15 wherein said transition metal carbide comprises tungsten carbide and said binder metal or alloy is selected from the group of iron, nickel, cobalt and copper.

17. The insert of claims 13, 14, or 15 wherein said one phase of said powder metallurgical composite is concentrated relative to said other phase along the central longitudinal axis of said insert and said other phase is concentrated relative to said one phase near the outer surface of said insert, with a radially oriented gradient therebetween.

18. The insert of claims 13, 14 or 15 wherein the outermost end of said protruding portion of said insert has one phase concentrated relative to the other phase, and the base portion has the other phase concentrated relative to said one phase, with a longitudinal gradient therebetween.

* * * * *